US010619268B2

(12) United States Patent
Aldridge et al.

(10) Patent No.: US 10,619,268 B2
(45) Date of Patent: Apr. 14, 2020

(54) METAL DETECTABLE FIBER AND ARTICLES FORMED FROM THE SAME

(71) Applicant: Illinois Tool Works, Inc., Glenview, IL (US)

(72) Inventors: Emily Aldridge, Tucker, GA (US); Robert Martin, Tucker, GA (US); Karen Mertins, Tucker, GA (US)

(73) Assignee: ILLINOIS TOOL WORKS, INC., Glenview, IL (US)

( * ) Notice: Subject to any disclaimer, the term of this patent is extended or adjusted under 35 U.S.C. 154(b) by 742 days.

(21) Appl. No.: 14/496,818

(22) Filed: Sep. 25, 2014

(65) Prior Publication Data

US 2015/0132574 A1 May 14, 2015

Related U.S. Application Data

(60) Provisional application No. 61/903,830, filed on Nov. 13, 2013.

(51) Int. Cl.
*D01F 6/30* (2006.01)
*G01N 27/90* (2006.01)
(Continued)

(52) U.S. Cl.
CPC .................. *D01F 6/30* (2013.01); *D01F 1/10* (2013.01); *D06H 1/00* (2013.01); *G01N 23/083* (2013.01);
(Continued)

(58) Field of Classification Search
CPC ........ D06H 3/14; D06H 1/00; D06H 3/08–10; D06H 2201/10; G01N 23/083;
(Continued)

(56) References Cited

U.S. PATENT DOCUMENTS 3,068,547 A 12/1962 L'Hommedieu
3,491,802 A 1/1970 Mortensen et al.
(Continued)

FOREIGN PATENT DOCUMENTS

CN 101597811 A 12/2009
CN 101671864 A 3/2010
(Continued)

OTHER PUBLICATIONS

Niu Shaogan et al. "Fabrication of Magnetic Nanofibers Via Surface-Initiated RAFT Polymerization and Coaxial Electrospinning", Reactive & Functional Polymers, vol. 73, No. 11; Aug. 3, 2013, pp. 1447-1454.
(Continued)

*Primary Examiner* — Laura C Powers
*Assistant Examiner* — Larissa Rowe Emrich
(74) *Attorney, Agent, or Firm* — Blue Filament Law PLLC

(57) ABSTRACT

A fiber is provided with a polymer having a cross-section and a length. A particulate is distributed in the polymer in an amount to make the fiber detectable by X-ray detection or magnetic detection. The particulate is present in a core, a sheath, or both portions of polymer matrix. A process of detecting a fabric article is provided that includes the formation of a fiber in the form of a polymer having a cross-section and a length. A particulate is distributed in the polymer. A fiber is formed into a fabric. A fabric article is then manufactured from the fabric. The fabric article passes through an X-ray detector or a magnetic detector. A signal is collected from the X-ray detector or the magnetic detector indicative of the presence of the fabric article.

18 Claims, 2 Drawing Sheets

(51) Int. Cl.
 *G01N 23/083* (2018.01)
 *G01V 15/00* (2006.01)
 *D06H 1/00* (2006.01)
 *D01F 1/10* (2006.01)

(52) U.S. Cl.
 CPC ......... *G01N 27/9006* (2013.01); *G01V 15/00* (2013.01); *D10B 2101/20* (2013.01); *D10B 2321/022* (2013.01); *Y10T 428/298* (2015.01); *Y10T 428/2929* (2015.01); *Y10T 428/2973* (2015.01); *Y10T 428/2978* (2015.01)

(58) Field of Classification Search
 CPC .............. G01V 15/00; Y10T 428/2929; Y10T 428/2982; D10B 2321/02–022; D10B 2331/02–021; D10B 2331/04–042; D10B 2331/10; D01F 1/02; D01F 1/10; D01F 1/106
 USPC ................. 428/546, 551–552, 372, 900, 400
 See application file for complete search history.

(56) References Cited

U.S. PATENT DOCUMENTS

| | | |
|---|---|---|
| 3,620,875 A | 11/1971 | Guglielmo, Sr. et al. |
| 3,633,533 A | 1/1972 | Allen et al. |
| 3,701,165 A * | 10/1972 | Huddleston .............. A41F 9/00 112/475.02 |
| 3,756,241 A | 9/1973 | Patience |
| 3,756,512 A | 9/1973 | Dyal |
| 3,867,935 A | 2/1975 | Eisdorfer et al. |
| 3,911,922 A * | 10/1975 | Kliger .................... A61F 13/44 428/159 |
| 3,929,659 A | 12/1975 | Graham |
| 4,068,666 A | 1/1978 | Shiff |
| 4,155,487 A | 5/1979 | Blake |
| 4,185,626 A | 1/1980 | Jones et al. |
| 4,345,718 A | 8/1982 | Horvath |
| 4,620,646 A | 11/1986 | Crapser |
| 4,620,656 A | 11/1986 | McClay et al. |
| 4,645,499 A | 2/1987 | Rupinskas |
| 4,664,971 A | 5/1987 | Soens |
| 4,692,380 A | 9/1987 | Reid |
| 4,718,897 A | 1/1988 | Elves |
| 4,935,019 A | 6/1990 | Papp, Jr. |
| 4,938,901 A | 7/1990 | Groitzsch et al. |
| 5,045,080 A | 9/1991 | Dyer et al. |
| 5,112,325 A | 5/1992 | Zachry |
| 5,178,354 A | 1/1993 | Engvall |
| 5,183,614 A | 2/1993 | Champion |
| 5,204,162 A * | 4/1993 | Ketcham .................. B01J 2/18 419/23 |
| 5,337,912 A | 8/1994 | Jochem |
| 5,379,924 A | 1/1995 | Taylor |
| 5,425,996 A | 6/1995 | Wilkie et al. |
| 5,522,921 A | 6/1996 | Custer |
| 5,670,239 A | 9/1997 | Hampp |
| 5,793,214 A | 8/1998 | Wakamatsu |
| 5,888,640 A | 3/1999 | Marotta et al. |
| 5,897,673 A | 4/1999 | Nishida et al. |
| 5,931,824 A | 8/1999 | Stewart et al. |
| 5,952,099 A | 9/1999 | Asher et al. |
| 6,177,113 B1 | 1/2001 | Kress et al. |
| 6,200,628 B1 | 3/2001 | Rozumek et al. |
| 6,332,993 B1 | 12/2001 | Jen |
| 6,356,782 B1 | 3/2002 | Sirimanne et al. |
| 6,371,904 B1 | 4/2002 | Sirimanne et al. |
| 6,395,147 B1 | 5/2002 | Wheat et al. |
| 6,502,726 B1 | 1/2003 | Yquel |
| D487,353 S | 3/2004 | Wolf |
| 6,825,249 B1 | 11/2004 | Takeda et al. |
| 6,896,759 B2 | 5/2005 | Fujisawa et al. |
| 7,015,156 B2 | 3/2006 | Maldonado et al. |
| 7,038,766 B2 | 5/2006 | Kerns et al. |
| 7,044,957 B2 | 5/2006 | Foerster et al. |
| 7,053,013 B1 | 5/2006 | Nosov et al. |
| 7,222,727 B2 | 5/2007 | Aisenbrey |
| 7,229,417 B2 | 6/2007 | Foerster et al. |
| 7,242,176 B2 | 7/2007 | Thomason |
| 7,465,847 B2 | 12/2008 | Fabian |
| 7,568,590 B1 | 8/2009 | Gross et al. |
| 7,625,397 B2 | 12/2009 | Foerster et al. |
| 7,631,767 B2 | 12/2009 | May et al. |
| 7,668,582 B2 | 2/2010 | Sirimanne et al. |
| 7,703,674 B2 | 4/2010 | Stewart et al. |
| 7,795,491 B2 | 9/2010 | Stewart et al. |
| 7,952,375 B2 | 5/2011 | Eldridge et al. |
| 8,075,985 B2 | 12/2011 | Lee et al. |
| 8,093,161 B2 | 1/2012 | Bansal et al. |
| 8,267,681 B2 | 9/2012 | Gupta et al. |
| 8,410,006 B2 | 4/2013 | Chappas et al. |
| 8,980,982 B2 | 3/2015 | Martin et al. |
| 9,303,342 B2 | 4/2016 | Wang et al. |
| 2004/0031798 A1 | 2/2004 | Fox et al. |
| 2004/0142495 A1 | 7/2004 | Hartman et al. |
| 2004/0154072 A1 * | 8/2004 | Connor .............. A41D 19/0055 2/167 |
| 2005/0153857 A1 | 7/2005 | Sherry et al. |
| 2005/0236407 A1 | 10/2005 | Aisenbrey |
| 2007/0003761 A1 * | 1/2007 | Miyazono ................. D01F 1/10 428/375 |
| 2007/0205529 A1 | 9/2007 | May et al. |
| 2007/0219516 A1 * | 9/2007 | Patel ...................... A61F 13/36 604/362 |
| 2008/0290649 A1 | 11/2008 | Klein et al. |
| 2009/0302241 A1 * | 12/2009 | Abe ........................ D01F 6/60 250/519.1 |
| 2010/0087731 A1 | 4/2010 | Ramachandran |
| 2010/0124644 A1 | 5/2010 | Hein et al. |
| 2010/0187171 A1 | 7/2010 | Gupta |
| 2010/0187712 A1 | 7/2010 | Gupta et al. |
| 2010/0221969 A1 | 9/2010 | Chen et al. |
| 2010/0247371 A1 | 9/2010 | Farrugia et al. |
| 2011/0231983 A1 * | 9/2011 | Chan .................. A41D 19/01511 2/167 |
| 2011/0277261 A1 | 11/2011 | Hasket et al. |
| 2012/0000691 A1 | 1/2012 | Shah et al. |
| 2012/0164907 A1 | 6/2012 | Restuccia et al. |
| 2012/0289107 A1 * | 11/2012 | Beissinger ............. D04H 13/00 442/1 |
| 2015/0132574 A1 | 5/2015 | Aldridge et al. |
| 2015/0183090 A1 | 7/2015 | Hsu et al. |
| 2016/0024699 A1 | 1/2016 | Aldridge et al. |

FOREIGN PATENT DOCUMENTS

| | | |
|---|---|---|
| EP | 0160560 A2 | 11/1985 |
| EP | 0942804 A1 | 9/1999 |
| EP | 1217105 A1 | 6/2002 |
| EP | 1 650 556 A1 | 4/2006 |
| EP | 1650556 A1 | 4/2006 |
| EP | 1 776 006 A1 | 4/2007 |
| EP | 1776006 | 4/2007 |
| EP | 1776006 A1 | 4/2007 |
| GB | 2 315 698 | 2/1998 |
| GB | 2315698 A | 2/1998 |
| GB | 2 372 934 A | 9/2002 |
| GB | 2372934 A | 9/2002 |
| GB | 2372934 | 11/2002 |
| JP | H0931749 A | 2/1997 |
| JP | 2002 020554 | 1/2002 |
| JP | 2002020554 A | 1/2002 |
| JP | 2005009024 A | 1/2005 |
| JP | 2008303525 A | 12/2008 |
| JP | 2014095170 A | 5/2014 |
| KR | 890001835 B1 | 5/1989 |
| KR | 20010086868 A | 9/2001 |
| KR | 20020050902 A | 6/2002 |
| WO | 9305101 A1 | 3/1993 |
| WO | WO 9305101 | 3/1993 |
| WO | 0023275 A1 | 4/2000 |
| WO | WO 00/23275 A1 | 4/2000 |

(56) References Cited

FOREIGN PATENT DOCUMENTS

| WO | 2004094763 A2 | 11/2004 |
|---|---|---|
| WO | 2005061649 A1 | 7/2005 |
| WO | WO 2005/061649 A1 | 7/2005 |
| WO | WO 2005061649 | 7/2005 |
| WO | 2006026823 A1 | 3/2006 |
| WO | WO 2006/026823 A1 | 3/2006 |
| WO | 2007012898 A1 | 2/2007 |
| WO | WO 2007/012898 | 2/2007 |
| WO | 2008146529 A1 | 12/2008 |
| WO | 2017048897 A1 | 3/2017 |

OTHER PUBLICATIONS

Dong Wang et al. "Novel Fabrication of Magnetic Thermoplastic Nanofibers Via Melt Extrusion of Immiscible Blends", Polymers for Advanced Technologies, vol. 24, No. 1, Jun. 12, 2012, pp. 70-74.
International Search Report dated Oct. 2, 2015 for International Application No. PCT/US2015/041461 filed Jul. 22, 2015.
Written Opinion of the International Searching Authority dated Oct. 2, 2015 for International Application No. PCT/US2015/041461 filed Jul. 22, 2015.
International Search Report dated May 17, 2019 for International Application No. PCT/US2019/018013 filed Feb. 14, 2019.
International Search Report dated Nov. 28, 2016 for International Application No. PCT/US2016/051836 filed Sep. 15, 2016.
International Search Report dated Jun. 27, 2012 for International Application No. PCT/US2012/030249 filed Mar. 23, 2012.
European Search Report dated Jan. 27, 2017 for European Application No. 16188423 filed Mar. 23, 2012.

* cited by examiner

METAL DETECTABLE FIBER AND ARTICLES FORMED FROM THE SAME

RELATED APPLICATIONS

This application claims priority benefit of U.S. Provisional Application Ser. No. 61/903,830 filed Nov. 13, 2013; the contents of which are hereby incorporated by reference.

FIELD OF THE INVENTION

The present invention relates to the technical field of polymeric composite fibers, and in particular to polymeric fibers with high loadings of metal particulate that render articles formed from such fibers X-ray or magnetic detectable.

BACKGROUND OF THE INVENTION

Many industries have a need for metal detectable polymers and articles made therefrom. By way of example, a food, medical or pharmaceutical production line maintains tight audit control of service items that enter the manufacturing facility to assure such items do not accidently enter the production stream as a contaminant that can be fragmented into dangerous shards. Historically, plastics have been precluded from some environments due the inability to locate such articles with product screening X-ray or magnetic detectors. Recently, plastic articles have been developed that are filled with metal particulate or barium sulfate, as detailed in co-pending application Ser. No. 13/372,997 filed Feb. 14, 2012 that are detectable with magnetic or X-ray detectors, yet still process as injection moldable thermoplastics and operate in manner similar to their unfilled conventional counterparts.

By way of example, U.S. Pat. No. 5,897,673 teaches fibers containing fine metallic particles that are cross-linked to the polymeric fiber. While various pure metals are contemplated in the literature, little attention has been paid to the unique problems associated with stainless steel particulate. As many foods and manufactured substances can only be exposed to stainless steel, the lack of stainless steel particle filled fibers precludes the usage of many useful articles from these controlled manufacturing sites. By way of example various wipes, hair covers, suits, aprons and shoe covers and other manufacturing aids or personal protective equipment if made from stainless steel containing fibers could allow better quality control of manufacturing with less stringent audit processes as any such articles lost in a production stream could be detected by X-ray or magnetic anomaly.

Thus, there exists a need for a thermoplastic fiber filled with detectable particulate. There also exists a need for such fibers that process and retain properties of conventional thermoplastic fibers to promote production of various articles from fibers that have the added benefit of being X-ray or magnetically detectable while operating in a manner similar to conventional articles.

SUMMARY OF THE INVENTION

The present invention is to provide nonwoven material for wipes for various wiping applications such as personal hygiene, equipment and parts cleaning. It can also be used to manufacture various personal protective items such as shoe covers, hair nets, beard nets, sleeve covers, aprons or any other protective item that can be used in the food, medical, pharmaceutical or other industries where there is a concern regarding foreign object contamination. The material may also be used to manufacture other materials such as filters and filter media and electrostatically dissipative products. The invention would incorporate metal and X-ray detectible additives into the manufacture of nonwoven materials used in cleaning wipes, as well as the packaging container or the above listed protective items. This would allow for the detection of the wipe or container or the above listed protective item that was lost into the production stream, potentially contaminating a product, process or procedure. The invention would incorporate commercially available detectable additives at 5.0 to 25.0 weight percent loadings in the meltblown fiber, spunbond fiber, or staple fiber for the manufacturing the nonwoven material to be used in wipes as well as the outside container, or the above listed protective and sanitary items. This is accomplished by incorporating a 400 series stainless steel powder with a particle size of D90<16 micron into a monofilament or bi-component fiber in the spinning process. The novel feature is that processing, cleaning and protective items formed with fibers containing the above referenced detectable additive can be located if lost in processing unlike the items that are currently available which are not detectable if lost thereby contaminating a product, process or procedure in the food, medical, pharmaceutical or other industries where contamination is a concern. Another novel feature is that the nonwoven material described to manufacture all of these items is detectable.

The closest known prior art is the existing material commercially available in the packaging industry for manufacturing all of the above listed products.

The deficiencies in the prior art are that current materials are not detectible if lost which contaminates a product, process or procedure in any of the industries previously mentioned.

The advantage of the invention is that it would be detectable with commercially available metal detectors and x-ray equipment.

SUMMARY OF THE INVENTION

A fiber is provided with a polymer having a cross-section and a length. A particulate is distributed in the polymer in an amount to make the fiber detectable by X-ray detection or magnetic detection. The particulate is present in a core, a sheath, or both portions of the fiber defined by a polymer matrix.

A process of detecting a fabric article is provided that includes the formation of a fiber in the form of a polymer having a cross-section and a length. A particulate is distributed in the polymer. A fiber is formed into a fabric. A fabric article is then manufactured from the fabric. The fabric article passes through an X-ray detector or a magnetic detector. A signal is collected from the X-ray detector or the magnetic detector indicative of the presence of the fabric article.

BRIEF DESCRIPTION OF THE DRAWINGS

The present invention is further detailed with respect to the following figures that depict various aspects of the present invention.

FIGS. 2A-2D these have particulate in the 90% core only are micrographs of like diameter polypropylene (PP) fibers loaded to 12% by weight with stainless steel particulate, where all depicted micrographs of the same magnification.

DETAILED DESCRIPTION OF THE PREFERRED EMBODIMENTS

Figure 1A:
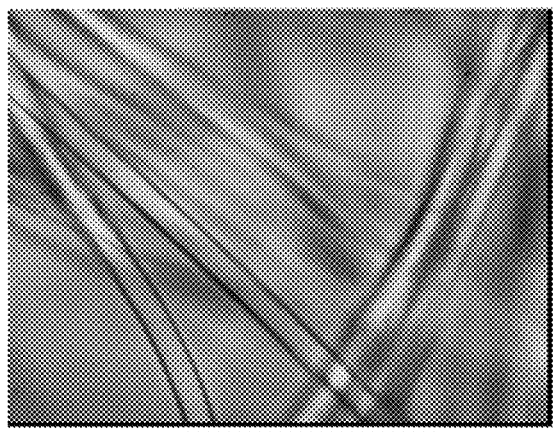
FIGS. 1A-1D and FIGS. 2A-2D are transmission optical micrographs. Conventional prior art 100% polypropylene (PP) fibers (upper left—FIG. 1A), while FIGS. 1B-1D (upper right—FIG. 1B), (lower left—FIG. 1C), and (lower right—FIG. 1D) these have particulate in the sheath and the core.

The present invention has utility as a fiber that is electromagnetic spectrally detectable and suitable for usage in a variety of fields including food production, medical, and pharmaceutical production environments.

As used herein, the term "fiber" defines both fibers of finite length, such as conventional preselected length fiber, as well as substantially continuous structures, such as continuous filaments, unless otherwise indicated. The fibers of the present invention are appreciated to be hollow or solid fibers, and further can have a substantially round or circular cross-section or cross-sections of different symmetry space groups with other cross-sections illustratively including oval; lobular; polygonal such as triangular, square, rectangular, trapezoidal, pentagonal, and hexagonal. A fiber of the present invention in some embodiments has a sheath that varies in polymer or particulate, with the variation being as to composition or concentration, or both such properties.

As used herein, the term "multi-component fibers" is defined to include preselected length fiber and continuous filaments with two or more discrete structured domains of deliberately different composition or component concentration and is intended to specifically include sheath/core and island configurations.

As used herein, the term "yarn" defines multiple fibers wound together into a single continuous strand.

It is to be understood that in instances where a range of values are provided that the range is intended to encompass not only the end point values of the range but also intermediate values of the range as explicitly being included within the range and varying by the last significant figure of the range. By way of example, a recited range of from 1 to 4 is intended to include 1-2, 1-3, 2-4, 3-4, and 1-4.

It is appreciated that both the cross-sectional shape of the fiber and the configuration of the particulate and other components therein depends upon the equipment that is used in the preparation of the fiber, the process conditions, and the melt viscosities of the various components. A wide variety of fiber configurations are readily produced according to the present invention to achieve loadings sufficient for magnetic or X-ray detection. Generally, as illustrated in the figures, a fiber of the invention is a single or multi-component composite fiber formed from a melt of one or more polymeric materials loaded with one or more metallic materials as specified below.

The polymeric component of an inventive fiber is readily selected from any of the types of polymers known in the art that are capable of being formed into fibers, including polyolefins, polyvinyl, polyvinyl alcohol, polyesters, polyamides, co-polymers containing any of the aforementioned polymers as blocks of a copolymer, and combinations thereof. Specific polyolefins operative herein illustratively include polypropylene; polyethylene; polybutene; and polyisobutylene; polyamides such as NYLON 6 and NYLON 6,6; polyacrylates; polystyrenes; polyurethanes; acetal resins; polyethylene vinyl alcohol; polyesters such as polyethylene terephthalate (PET), polyethylene naphthalate, polytrimethylene terephthalate, poly(1,4-cyclohexylene dimethylene terephthalate) (PCT), polycarbonates; and aliphatic polyesters such as polylactic acid (PLA); polyphenylene sulfide; thermoplastic elastomers; polyacrylonitrile; cellulose and cellulose derivatives; polyaramids; acetals; fluoropolymers; copolymers and terpolymers thereof and mixtures or blends thereof, and without regard as whether a given polyolefin is syndiotacic, eutectic, isotactic, or atactic.

Specific examples of aliphatic polyesters operative in the present invention include fiber forming polymers formed from a combination of an aliphatic glycol such as ethylene glycol, propylene glycol, butylene glycol, hexanediol, octanediol or decanediol) or an oligomer of ethylene glycol (e.g., diethylene glycol or triethylene glycol) with an aliphatic dicarboxylic acid such as succinic acid, adipic acid, hexanedicarboxylic acid or decaneolicarboxylic acid); or the self-condensation of hydroxy carboxylic acids other than poly(lactic acid), such as polyhydroxy butyrate, polyethylene adipate, polybutylene adipate, polyhexane adipate, and copolymers containing the same. Aromatic polyesters operative in the present invention include fiber forming polymers formed from polyesters of alkylene glycols having 2-10 carbon atoms and aromatic diacids; polyalkylene naphthalates, which are polyesters of 2,6-naphthalenedicarboxylic acid and alkylene glycols, as for example polyethylene naphthalate; or polyesters derived from 1,4-cyclohexanedimethanol and terephthalic acid, as for example polycyclohexane terephthalate. Exemplary polyalkylene terephthalates include polyethylene terephthalate (also PET) and polybutylene terephthalate.

In some inventive embodiments that are compliant with food, medical and pharmaceutical processing standards, the particulate is stainless steel. Other compositions of particulate to render an inventive fiber magnetic or X-ray signal detectable include iron, bronze, brass, steel, barium salts, cobalt, titanium, tin, copper, tungsten, platinum, silver, bismuth, zinc, lead, molybdenum, neodymium, samarium, alloys of any of the aforementioned, oxides of any of the aforementioned metals, nitrides of any of the aforementioned. It is appreciated that cobalt alloys such as cobalt-samarium, and neodymium alloys have exceptionally high magnetic moments that allow for magnetic detection at lower weight loading compared for ferrite. In some inventive embodiments, the stainless steel is ferromagnetic and detectable by magnetic induction coil detectors. Specific grades of stainless particulate operative herein include 300 series, 400 series and in particular 306 (L), 316 and 430 compositions. It is appreciated that in addition to spherical particulate shown in FIGS. 1B-1D; prolate spheroids, oblate spheroids, and cylindrical rods of the particulate are used in the present invention. It has been surprisingly discovered that non-spherical particulate tends to align along a fiber length with the shortest linear dimension axis from the three orthogonal axes of X-Y-Z oriented generally perpendicular to the longest axis length of the fiber.

The present invention attempts to retain the processing and performance properties of the native polymer while imparting the ability to render the fiber and articles formed therefrom X-ray or magnetic anomaly detectable. This is achieved by inclusion of particulate having a shortest linear dimension, as measured from among the three orthogonal Cartesian coordinate axes X-Y-Z that is less than or equal to one half the fiber cross-sectional average dimension along the three orthogonal Cartesian coordinate axes X-Y-Z. For the purposes of calculation of the particulate dimension, the average particle dimension is used for polydisperse particulate. By way of example, a circular cross-section fiber with a diameter of 35 microns is loaded with spherical particulate having a diameter of less or equal to 17 microns. In some inventive embodiments containing cylindrical rod particulate, the ratio of rod length to diameter is between 1.3-20:1 and in still other embodiments between 1.5-8:1

In certain embodiments, each of the polymeric components of an inventive fibers includes other substances known conventionally to modify a processing property or performance property. Such additive substances illustratively include antioxidants, stabilizers, surfactants, waxes, flow promoters, solid solvents, dyes, pigments, plasticizers and combinations thereof. It is appreciated that a pigment can encompass a composition of a particulate material detailed above to impart detectability to the inventive fiber and in such instances the pigment is compositionally distinct from the particulate and present in a lower weight percentage than the particulate.

It is appreciated that the loading of particulate to achieve X-ray or magnetic detection of articles formed from inventive fibers is dictated by factors including the X-ray cross-section or the magnetic susceptibility of a given particulate. Generally, ferromagnetic materials are detectable at loadings of from >2 total weight percent by magnetic induction detection. In those embodiments when the ferromagnetic material is a rare earth magnet, typical loadings are from 2 to 4 total weight percent for magnetic induction detection. In specific embodiments where the particulate is magnetic stainless steel or any other electromagnetic spectrally detectable particulate, typical loadings are from 5 to 25 total weight percent for magnetic induction detection. It is appreciated that the above typical loading can be exceeded, yet often at the expense of detrimentally influencing processibility or increasing material financial costs with only incremental improvements in detection.

Figure 1B:
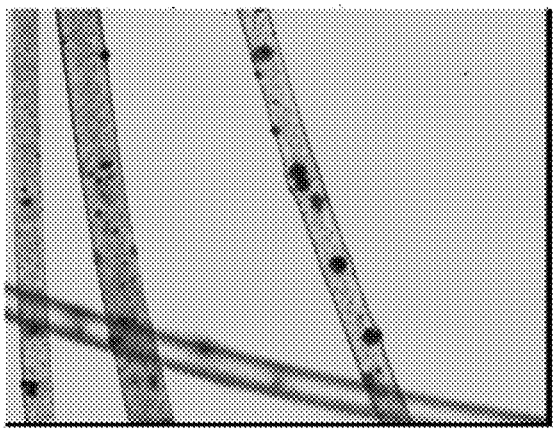
Figure 1C:
Figure 1D:
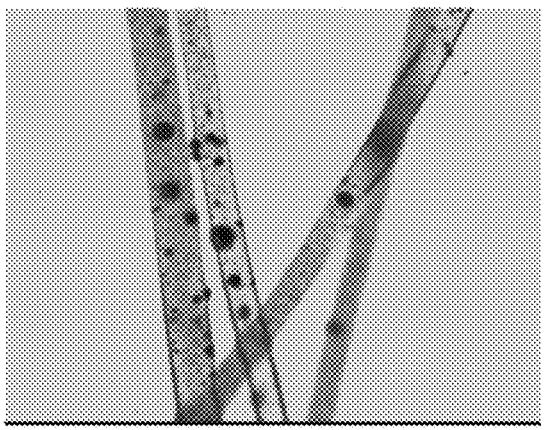
Figure 2A:
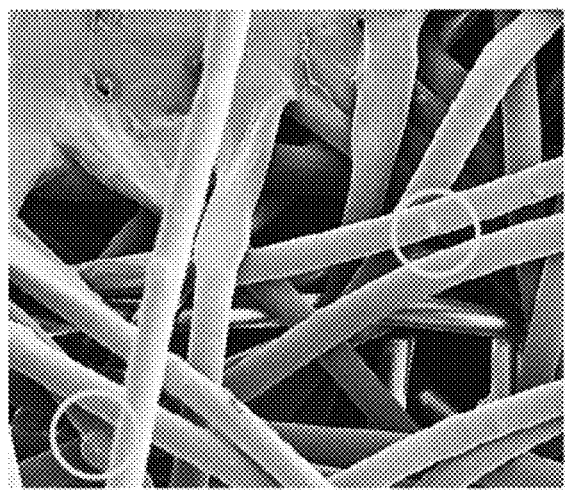
Figure 2B:
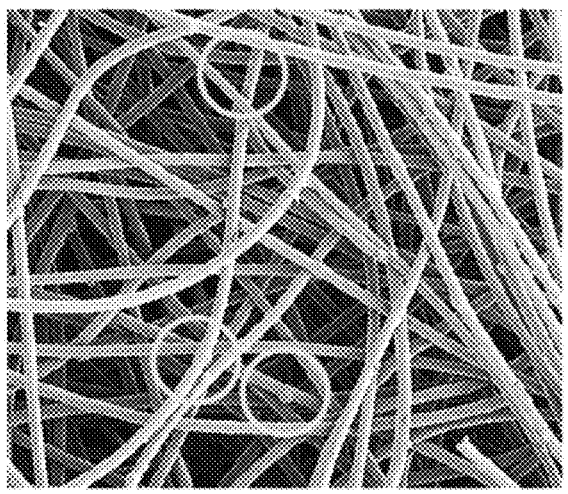
Figure 2C:
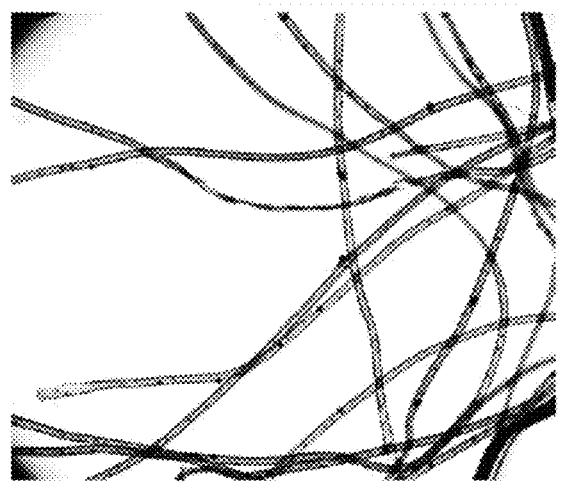
Figure 2D:
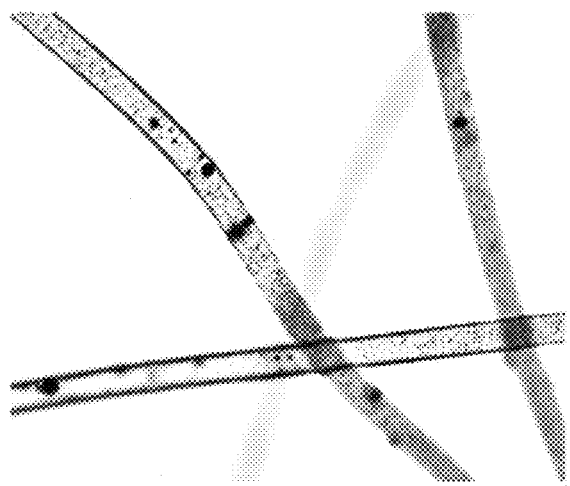

In order to manufacture fibers of the present invention, particles are compounded with one or more suitable prepolymeric or polymeric compounds, as defined above that will form the basic fiber structure. The compounded material then undergoes a melt-spinning process and forms metal/polymer composite fibers. Without intending to be bound to a particular theory, the melt-spinning process tends to align asymmetric particles with the shortest linear dimension axis along the direction of fiber draw. In particular inventive embodiments, the particulate forms protrusions extending from the sides of the fibers, as seen in FIGS. 1B-1D. These protrusions have the added benefit of increase fiber surface area for a given length of fiber and also appear to increase the energy needed to pull contiguous fibers from one another. With adjustment of melt temperature and draw rates, and in some instances modification of additive substances, inventive fibers are produced that have a homogenous distribution of particulate along the length of the fiber and retain 70% of the tensile strength of a given fiber composition absent particulate loading. In some embodiments a sheath is simultaneously drawn about a core. In still other embodiments, the sheath is free of particulate and the core is loaded with particulate. After extrusion, the fibers are drawn using technology known to those experienced in the art to their final tensile strength and diameter, preferably between 0.1 and 500 microns in diameter.

It has been surprisingly found that contrary to initial expectations, thermoplastic pellets loaded to up to 15 total weight percent in spite of being more dense than non-particulate loaded thermoplastic pellets, are melt-spun without adjusting the feeding system, yet absent magnets in instances of magnetic particulate. Without intending to be bound to a particular theory, it is believed that the thermal retention of the particulate affects the filament cool down and draw behavior.

While most polymers are more stable in the spinning process when only moderate draw force is applied, it has been surprisingly found that for a stock of particulate loaded pellets, applying higher draw force resulted in drip free spinning behavior.

Generally, for melt-spinning multi-component composite fibers, at least two polymers are extruded separately and fed into a polymer distribution system wherein the polymers are introduced into a spinneret plate. In the present invention, the particulate and at least one polymer are mixed or blended prior to extrusion using known techniques into extrudable pellets. In such inventive embodiments, the particulate is homogeneously dispersed throughout the polymer in which it is dispersed as the polymer streams are fed into the spinneret plate. It is appreciated that a particulate loaded pellets are used as a feedstock alone or intermixed with non-loaded pellets or pellets that vary in at least property of polymer composition, particulate size, particulate composition, additive composition, additive loading, particulate loading, or a combination of such properties. The polymers follow separate paths to the fiber spinneret and are combined in a spinneret hole. The spinneret is configured so that the extrudant has the desired overall fiber cross-section. In a prototypical, multi-component composite fiber according to the present invention, a core is extruded from particulate loaded pellets with a sheath formed from a particulate free pellet feedstock.

Following extrusion through the die, the resulting thin fluid strands, or filaments, remain in the molten state for some distance before they are solidified by cooling in a surrounding fluid medium, which may be, for example, chilled air blown through the strands. Once solidified, the filaments are taken up on a godet roller or another take-up surface. In a continuous filament process, the strands can be taken up on a godet which draws down the thin fluid streams in proportion to the speed of the take-up godet. In a spunbond process, the strands can be collected in a jet, such as for example, an air attenuator, and blown onto a take-up surface such as a roller or a moving belt to form a spunbond web. In a meltblown process, air is ejected at the surface of the spinneret which serves to simultaneously draw down and cool the thin fluid streams as they are deposited on a take-up surface in the path of cooling air, thereby forming a fiber web.

Regardless of the type of melt spinning procedure used, generally the thin fluid streams are melt drawn down in a plastic state to orient the polymer molecules for good tenacity. Typical melt draw down ratios known in the industry are operative herein. In instances employing continuous filament or staple processes, in certain embodiments, the strands are drawn in the solid state with conventional drawing equipment, such as, for example, sequential godets operating at differential speeds.

Following drawing in the solid state, the continuous filaments in certain inventive embodiments are mechanically crimped and cut into a desirable fiber length, thereby producing staple fiber. The length of the staple fibers typically ranges from 25 to 50 millimeters, although the fibers be cut to any desired length outside this range.

The multi-component fibers of the invention can be staple fibers, continuous filaments, or meltblown fibers. In general, staple fibers, multifilament, and spunbond fibers formed in accordance with the present invention can have a fineness of 0.1 to 500 microns per filament. Meltblown filaments can have a fineness of 0.1 to 500 microns. Monofilament fibers can have a fineness of 0.1 to 500 microns.

The multi-component fibers of the invention are useful in the production of a wide variety of products, including without limitation nonwoven structures, such as but not limited to, carded webs, wet laid webs, dry laid webs, spunbond webs, meltblown webs, and the like. The nonwoven webs can be bonded to transform the webs into a coherent nonwoven fabric using bonding techniques known in the industry. Exemplary bonding techniques for nonwoven webs include mechanical bonding, such as hydroentanglement and needle punching, adhesive bonding, thermal bonding, and the like. An example of thermal bonding is through air bonding, although other thermal bonding techniques, such as calendaring, microwave or other RF treatments are readily employed.

An inventive fiber is well suited for use in a composite product, such as one with a dual surface in which a melt blown web includes a surface layer of fibers applied on the surface of the web to create a different textured surface relative to the web. By way of example, a polypropylene web with the detectable inventive particle filled fiber for the textured side. A composite example has a spun bond melt blown spun bond (SMS) where only one layer has the inventive detectable fibers. SMS is a very common composite nonwoven used in surgical gowns.

Articles formed according to the present invention from such particulate loaded fibers illustratively include hair nets, protective suits, shoe covers, wipes, food packaging, aprons, beard covers, mop heads. Such products in certain embodiments retain the operational properties of non-particulate loaded fibers of the same polymer composition, with the added attribute of being detectable with conventional food, medical and pharmaceutical production magnetic or X-ray detectors.

In some inventive embodiments, the inventive fibers are subjected to a coating, laminate, or otherwise cover the outer and/or inner surfaces of threads or layers of material contained within any final product without falling outside the scope of the invention. This is a practice well known to those experienced in the art, and is commonly used to impart non-stick, low-friction, or additional chemical and heat resistance properties to the final product. However, additional non-polymeric particles identical, similar, or fundamentally different to the particles already contained within the composite fibers of the invention, yet at the expense of lowering the overall metal content loading of the resultant article unless such treatments carry therewith particulate.

In certain embodiments of the present invention a fiber or core portion of a sheathed fiber has particulate protruding from the wall of the fiber and a concomitant relative depletion of particulate from the central region of a fiber. The inclusion of a particulate protrusions and centrally depleted fiber region has been found to afford considerable benefits in increasing the loading amount of particulate to detectable levels and the energy needed to slide fibers past one another.

In some embodiments of the present invention, following extrusion but prior to coating or lamination, the fibers or other non-woven creations of the invention are coated, dusted, or otherwise induced to carry on the exterior of individual filaments or layers additional particulate identical, similar, or fundamentally different to the particulate already contained within the composite fibers of the invention.

Particulate is most easily adhered to the outside of the fibers using a process which passes the extruded filament or non-woven creation through an enclosed chamber, in which a fan system lifts and circulates the particulate throughout the air contained within the chamber such that a fraction of the particles that contact the filament will adhere to the surface.

In another embodiment of the invention, the fibers of the invention are used to make other textile structures such as, but not limited to, woven and knit fabrics. Yarns prepared for use in forming such woven and knit fabrics are similarly included within the scope of the present invention. Such yarns may be prepared from the continuous filament or spun yarns comprising staple fibers of the present invention by methods known in the industry, such as twisting or air entanglement.

In yet another embodiment of the invention, custom composite fibers of the invention are woven or otherwise used in the construction of fabric or fabric-like structures. The fabric performs comparably to standard polymer containing fabrics with respect to most attributes, such as strength, durability, and hand, yet like the fibers exhibits properties which deviate significantly from those normally associated with the polymeric material by those experienced in the art, these unique properties beside detectability illustratively include high density, conductivity, electromagnetic shielding, cut-resistance, heat-resistance, and radiation shielding relative to the base polymer absent particulate loading.

Fabrics are typically formed from fibers or filament via weaving or knitting. Woven fabrics are constructed by interlacing warp and weft yarns in any number of patterns. The fibers or filament produced by this invention are suitable for application in warp and/or weft yarns. Knit fabrics are constructed by interlocking loops of a continuous yarn or set of yarns in any number of warp or wale patterns. The fibers or filament produced by this invention are suitable for application in knitting yarns. Further detail is outside the scope of this invention, but is well known to those experienced in the art. Once formed, the fabric can be cut, sewn, and otherwise tailored towards its final purpose using techniques also known to those skilled in the art. Furthermore, the fabric of the present invention may be manufactured, tailored, or otherwise altered or modified in design to exhibit other functional properties without falling outside the scope of the invention. These alterations or modifications illustratively include micro-perforations, patches of alternative fabrics, seamless knitting, fashion-centric alterations, dyeing or other coloring, and snaps, zippers, or other pockets for the addition and removal of personal effects, weights, or other items to be carried or worn.

Additionally, the fabric of the present invention may be formed using a variety of different weaving or knitting techniques, both those known and unknown to those experienced in the art, without falling outside the scope of the present invention, which may result in additional qualities or properties of the final product. For example, processes and machinery have been developed to knit at very high speeds, at very low amounts of stress on the fiber or fabric, and in seamless and/or circular patterns and arrangements.

Modern metal detection is based on creating a magnetic field with a transmitter coil and two receiving coils wired in reverse. The resulting field is interrupted when a conductive or magnetic contaminant passes through the field. The contaminant is detected by measuring the change in voltage above the change in voltage of non-contaminated product. If a contaminant is detected, that product is rejected. Contaminants are generally categorized as sphere equivalents in millimeters. The sensitivity and throughput are machine dependent.

X-ray inspection is based on density. The higher the density of the object being examined, the more energy is absorbed. X-ray detection measures how much energy is absorbed by a product or contaminant. X-ray detection can detect contaminants such as glass or bone that a metal detector will not detect. X-ray detection can perform other quality functions outside the scope of product contamination. The present invention focuses on contaminant detection. The contaminants are generally categorized as sphere equivalents. The sensitivity and throughput are machine dependent.

The following example specific non-limiting examples of present invention. These examples should not be considered to be a limit on the scope of the appended claims.

EXAMPLE 1

Spherical stainless steel particulate (430 series) having a Poisson size distribution and an average particle size of 12 microns is mixed into polypropylene (PP) to form pellets with a particulate loading of 12 percent. The particles are melt-spun by running through a five screen of 40 mesh, 100 mesh, (34 micron), 60 mesh, and 31 mesh. The melt is then drawn to a fiber as shown in FIGS. 1B-1D. Some of the particulate is noted to be flattened or misshaped. The resulting fibers where formed into a non-woven cloth and subjected to metal detector response on a Loma $IQ^3+$ balanced coil metal detector alone or with various food products of a box of 8 packages of crackers, 1 pound of chicken on a tray and plastic wrapped, or pizza in a cardboard box. The results are provided in Table 2 for various sizes of clothes and fold configures. The values in millivolts for triplicate repeats with the threshold detections being noted.

TABLE 1

| 12% by weight stainless steel particles on PP fibers | | | | |
|---|---|---|---|---|
| Property | | Average | MIN | MAX |
| Basis weight | (g/m2) | 49.8 | 47.8 | 51.5 |
| Tensile strength, MD | (N/5 cm) | 53.3 | 47.6 | 54.6 |
| Tensile strength, CD | (N/5 cm) | 26.8 | 25.4 | 27.7 |
| Elongation at break, MI | (%) | 39.0 | 32.2 | 45.4 |
| Elongation at break, CD | (%) | 52.1 | 49.5 | 53.9 |
| Elongation at 10N, MD | (%) | 2.3 | 2.1 | 2.4 |
| Add-on | (%) | 1.1 | 1.0 | 1.1 |
| Water absorption | (%) | 602 | 580 | 629 |
| Ash content | (%) | 12.36 | 12.0 | 13.0 |

TABLE 2

Data for fibers that contain particles in both core and sheath in millivolts (mV).

| | Sample size | | | | | | | |
|---|---|---|---|---|---|---|---|---|
| | 1" × 2" | | 2" × 2" | | 3" × 2" | | 3" × 4" | |
| | Sample orientation | | | | | | | |
| | Perpendicular (perp) | parallel | Sqduared | angled | Perp | parallel | Perp | parallel |
| QC mode | 91 | 112 | 171 | 182 | 133 | 275 | 160 | 383 |
| Threshold = 200 | 102 | 111 | 204 | 581 | 148 | 305 | 208 | 301 |
| | 123 | 134 | 166 | 184 | 118 | 322 | 181 | 600 |
| Crackers | 416 | 344 | 665 | 709 | 709 | 1070 | 817 | 5681 |
| Threshold = 405 | 319 | 579 | 663 | 711 | 815 | 880 | 926 | 6115 |
| | 455 | 470 | 788 | 588 | 747 | 1078 | 899 | 6245 |
| Chicken | 13094 | 17059 | 24921 | 25783 | 23834 | 33750 | 28794 | 41247 |
| Threshold = 7445 | 12031 | 17131 | 24299 | 24012 | 24083 | 35096 | 29146 | 41089 |
| | 12933 | 16986 | 24705 | 25879 | 23954 | 35474 | 27593 | 41322 |
| Pizza | 610 | 723 | 1300 | 1197 | 1236 | 1739 | 1439 | 2190 |
| Threshold = 593 | 646 | 740 | 1243 | 994 | 1547 | 1730 | 1449 | 2092 |
| | 610 | 730 | 1263 | 1179 | 1230 | 1934 | 1499 | 2101 |

Data for fibers that contain particles in both core and sheath in millivolts (mV).

| | Sample size | | | | | | |
|---|---|---|---|---|---|---|---|
| | 6" × 2" | | | 6" × 4" | | | |
| | Sample orientation | | | | | | |
| | Perp | parallel | Folded parallel | Perp | parallel | Folded parallel | Folded perp |
| QC mode | 177 | 798 | 1265 | 272 | 581 | 9819 | 597 |
| Threshold = 200 | 175 | 707 | 949 | 243 | 581 | 10442 | 548 |
| | 128 | 732 | 974 | 285 | 490 | 9582 | 590 |
| Crackers | 651 | 7213 | 7196 | 1542 | 7317 | 8329 | 6800 |
| Threshold = 405 | 792 | 7026 | 7274 | 1348 | 7279 | 8352 | 7218 |
| | 668 | 7201 | 7118 | 1467 | 7344 | 8389 | 7138 |
| Chicken | 18830 | 65205 | 10008 | 40745 | 64786 | 18055 | 15154 |
| Threshold = 7445 | 19235 | 39671 | 10922 | 37828 | 64090 | 23771 | 43930 |
| | 19593 | 35352 | 7712 | 37506 | 64871 | 22420 | 40183 |
| Pizza | 1000 | 3965 | 4245 | 1909 | 3230 | 14205 | 21827 |
| Threshold = 593 | 1012 | 3608 | 4099 | 1904 | 3197 | 14189 | 21319 |
| | 989 | 3637 | 4124 | 1929 | 3194 | 14249 | 22119 |

TABLE 2-continued

Data for fibers that contain particles in both core and sheath

| | | | | Sample size | | | | | |
|---|---|---|---|---|---|---|---|---|---|
| | | 3" × 8" | | | | 6" × 6" | | | |
| | | | | Sample orientation | | | | | |
| | Perpendicular (perp) | parallel | Folded perp. | Folded parallel | Squared | 90 deg. turn | Folded parallel | Folded perp | Folded twice |
| QC mode | 372 | 5399 | 504 | 6618 | 410 | 395 | 17189 | 395 | 19873 |
| Threshold = 200 | 179 | 5346 | 455 | 6618 | 389 | 381 | 17417 | 466 | 19846 |
| | 411 | 5312 | 455 | 6304 | 405 | 411 | 17506 | 463 | 19779 |
| Crackers | 722 | 7093 | 1782 | 6947 | 1141 | 1301 | 7386 | 1259 | 7488 |
| Threshold = 405 | 768 | 7004 | 1670 | 6931 | 1192 | 1192 | 7416 | 1130 | 7441 |
| | 665 | 6985 | 1830 | 6925 | 1239 | 1303 | 7434 | 1004 | 7509 |
| Chicken | 21621 | 9718 | 57467 | 13423 | 52821 | 55577 | 43489 | 55760 | 35619 |
| Threshold = 7445 | 21880 | 8680 | 57199 | 12971 | 52312 | 55361 | 43672 | 55437 | 36569 |
| | 21674 | 9744 | 57019 | 12920 | 53482 | 56295 | 42833 | 56008 | 36437 |
| Pizza | 1433 | 7971 | 3191 | 10785 | 3196 | 2916 | 21901 | 2954 | 22219 |
| Threshold = 593 | 1496 | 8027 | 3188 | 10144 | 3214 | 2944 | 21792 | 2992 | 22682 |
| | 1469 | 7532 | 3251 | 10186 | 3158 | 2916 | 21793 | 3003 | 22636 |

Data for fibers that contain particles in both core and sheath

| | | | Sample size | | | |
|---|---|---|---|---|---|---|
| | | | 6" × 8" | | | |
| | | | Sample orientation | | | |
| | Perpendicular (perp) | parallel | Folded perp. | Folded parallel | Folded 2X parallel | Folded 2X perp |
| QC mode | 348 | 638 | 14269 | 391 | 16623 | 20800 |
| Threshold = 200 | 398 | 652 | 14069 | 372 | 17028 | 20628 |
| | 352 | 576 | 14207 | 420 | 17269 | 20742 |
| Crackers | 1296 | 4876 | 7812 | 11489 | 7822 | 10772 |
| Threshold = 405 | 1341 | 5483 | 7701 | 11544 | 7666 | 10678 |
| | 1282 | 4808 | 7840 | 11500 | 7626 | 10685 |
| Chicken | 46423 | 9961 | 40313 | 51372 | 46157 | 53008 |
| Threshold = 7445 | 47372 | 11177 | 38648 | 51954 | 45740 | 53495 |
| | 44670 | 8549 | 39690 | 51191 | 40676 | 52558 |
| Pizza | 3121 | 4072 | 18873 | 24487 | 24938 | 26107 |
| Threshold = 593 | 2977 | 4051 | 18601 | 24164 | 21384 | 26022 |
| | 2934 | 4058 | 18155 | 24938 | 21206 | 26142 |

Table 3 is a plot of the ferrous sphere size equivalents of the fibers in FIGS. 1B-1D where the metal detector was set to a wet conductive product with a phase out point of ~90°. Weight units are in grams.

| | | | | ≈Fe Sphere Equivalent | | | |
|---|---|---|---|---|---|---|---|
| | Weight | Parallel | Perpendicular | Folded Parallel | Folded Perpendicular | Folded Twice Parallel | Folded Twice Perpendicular |
| 1" × 2" | 0.0648 | 1.3 mm | 1.3 mm | N/A | N/A | N/A | N/A |
| 2" × 2" | 0.1347 | 1.7 mm | 1.7 mm | N/A | N/A | N/A | N/A |
| 3" × 4" | 0.3874 | 2.4 mm | 2.5 mm | N/A | N/A | N/A | N/A |
| 2" × 6" | 0.4389 | 2.1 mm | 2.6 mm | 2.4 mm | 2.5 mm | N/A | N/A |
| 3" × 8" | 0.7865 | 2.6 mm | 3.3 mm | 3.1 mm | 3.2 mm | N/A | N/A |
| 4" × 6" | 0.9116 | 2.7 mm | 3.1 mm | 3.0 mm | 3.1 mm | N/A | N/A |
| 6" × 6" | 1.2597 | 3.5 mm | 3.5 mm | 3.4 mm | 3.9 mm | N/A | N/A |
| 6" × 8" | 1.7394 | 3.4 mm | 3.8 mm | 3.7 mm | 4.0 mm | 4.0 mm | 4.3 mm |

EXAMPLE 2

The process of Example 1 is repeated with like conditions except that a 10% by weight sheath of PP devoid of stainless steel particulate The melt pumps for the sheath and core polymers are set to produce a ratio of 90%:10% of the cross sectional area of each fiber occupied by the polymeric core and particulate loaded core, respectively. The properties are noted to be superior to that to Example 1 with the addition of a surface treatment to enhance water absorption to 600% of the fiber mass for a non-woven fabric. The fiber is shown in FIGS. 2A-2D. The resulting fibers where formed into a non-woven cloth and subjected to metal detector response on a Loma IQ³+ balanced coil metal detector alone or with various food products of a box of 8 packages of crackers, 1 pound of chicken on a tray and plastic wrapped, or pizza in a cardboard box. The results are provided in Table 4 for various sizes of clothes and fold configures. The values in millivolts for triplicate repeats with the threshold detections being noted.

TABLE 4

Data for fibers that contain particulate in only core in millivolts (mV).

| | Sample size | | | | | | | | | | | | | | |
|---|---|---|---|---|---|---|---|---|---|---|---|---|---|---|---|
| | 1" × 2" | | 2" × 2" | | 3" × 2" | 3" × 4" | | | | 6" × 2" | | | 6" × 4" | | |
| | Sample orientation | | | | | | | | | | | | | | |
| | Perpendicular (perp) | parallel | Squared | angled | Perp | parallel | Perp | parallel | Perp | parallel | Folded parallel | Perp | parallel | Folded parallel | Folded perp |
| QC mode | 77 | 119 | 126 | 119 | 110 | 222 | 168 | 229 | 100 | 534 | 578 | 204 | 622 | 3648 | 435 |
| Threshold = 200 | 72 | 96 | 120 | 140 | 119 | 206 | 207 | 256 | 154 | 508 | 557 | 104 | 417 | 3504 | 432 |
| | 77 | 523 | 618 | 121 | 92 | 198 | 149 | 231 | 90 | 493 | 604 | 238 | 450 | 3222 | 451 |
| Crackers | 1305 | 2238 | 2643 | 2537 | 2518 | 3879 | 3654 | 5153 | 2512 | 8612 | 8651 | 4866 | 8561 | 13557 | 7996 |
| Threshold = 810 | 1223 | 2169 | 2815 | 2745 | 2297 | 3676 | 3535 | 5094 | 2575 | 8358 | 8757 | 4676 | 8498 | 13906 | 8073 |
| | 1272 | 2214 | 2731 | 2679 | 2369 | 3950 | 3683 | 5007 | 2436 | 8796 | 8863 | 4614 | 8483 | 13786 | 8152 |
| Pizza | 760 | 985 | 1326 | 1270 | 1258 | 1899 | 1568 | 2405 | 1024 | 3440 | 3662 | 1902 | 3346 | 4938 | 3396 |
| Threshold = 593 | 816 | 1030 | 1323 | 1264 | 1301 | 1948 | 1634 | 2282 | 1030 | 3337 | 3164 | 1908 | 3293 | 4925 | 3440 |
| | 753 | 1017 | 1335 | 1312 | 1255 | 2772 | 1622 | 2353 | 1017 | 3318 | 3611 | 1936 | 3323 | 5020 | 3385 |

Data for fibers that contain particles in both core and sheath

| | Sample size | | | | | | | |
|---|---|---|---|---|---|---|---|---|
| | 3" × 8" | | | | 6" × 6" | | | |
| | Sample | | | | | | | |
| | Perpendicular (perp) | parallel | Folded perp. | Folded parallel | Squared | 90 deg. turn | Folded parallel | Folded perp | Folded twice |
| QC mode | 117 | 2430 | 419 | 4117 | 301 | 336 | 11969 | 381 | 15515 |
| Threshold = 200 | 326 | 3188 | 408 | 4011 | 244 | 328 | 11989 | 390 | 14599 |
| | 135 | 2957 | 385 | 4195 | 254 | 318 | 10818 | 356 | 14397 |
| Crackers | 5449 | 15979 | 8071 | 14131 | 7664 | 7116 | 18038 | 7600 | 17996 |
| Threshold = 810 | 5153 | 16215 | 8104 | 14198 | 7381 | 6931 | 17951 | 7540 | 17876 |
| | 5115 | 16206 | 8016 | 14193 | 7665 | 7093 | 18070 | 7758 | 18019 |
| Pizza | 2709 | 5205 | 4047 | 6198 | 2155 | 2210 | 11705 | 2315 | 12719 |
| Threshold = 200 | 2681 | 5778 | 3399 | 6027 | 2149 | 2316 | 11683 | 2317 | 12482 |
| | 2752 | 4377 | 3474 | 5939 | 2076 | 2326 | 11777 | 2340 | 12741 |

Data for fibers that contain particles in both core and sheath

| | Sample size | | | | | |
|---|---|---|---|---|---|---|
| | 6" × 8" | | | | | |
| | Sample orientation | | | | | |
| | Perpendicular (perp) | parallel | Folded perp. | Folded parallel | Folded 2X parallel | Folded 2X perp |
| QC mode | 292 | 516 | 10333 | 569 | 9112 | 20152 |
| Threshold = 200 | 294 | 479 | 10115 | 492 | 9644 | 20124 |
| | 288 | 874 | 9221 | 493 | 9268 | 20169 |
| Crackers | 9466 | 11776 | 17091 | 10496 | 17470 | 23106 |
| Threshold = 810 | 9296 | 11860 | 16815 | 10403 | 17534 | 23264 |
| | 9020 | 11845 | 17078 | 10308 | 17463 | 23366 |
| Pizza | 3436 | 3269 | 9019 | 3464 | 9306 | 22300 |
| Threshold = 200 | 3606 | 3308 | 9137 | 3416 | 9431 | 22868 |
| | 3849 | 3187 | 9076 | 3483 | 9422 | 22716 |

Table 5 is a plot of the ferrous sphere size equivalents of the fibers in FIGS. 2A-2D where the metal detector was set to a wet conductive product with a phase out point of ~90°. Weight units are in grams.

| | | | | ≈Fe Sphere Equivalent | | | |
|---|---|---|---|---|---|---|---|
| | Weight | Parallel | Perpendicular | Folded Parallel | Folded Perpendicular | Folded Twice Parallel | Folded Twice Perpendicular |
| 1" × 2" | 0.0783 | 1.2 mm | 1.2 mm | N/A | N/A | N/A | N/A |
| 2" × 2" | 0.1318 | 1.6 mm | 1.6 mm | N/A | N/A | N/A | N/A |
| 3" × 4" | 0.3699 | 2.2 mm | 2.2 mm | N/A | N/A | N/A | N/A |
| 2" × 6" | 0.3905 | 2.0 mm | 2.3 mm | 2.2 mm | 2.2 mm | N/A | N/A |
| 3" × 8" | 0.8055 | 2.4 mm | 3.1 mm | 3.0 mm | 3.0 mm | N/A | N/A |

-continued

|  | | ≈Fe Sphere Equivalent | | | | |
|---|---|---|---|---|---|---|
|  | Weight | Parallel | Perpendicular | Folded Parallel | Folded Perpendicular | Folded Twice Parallel | Folded Twice Perpendicular |
| 4" × 6" | 0.8011 | 2.8 mm | 3.0 mm | 3.0 mm | 3.1 mm | N/A | N/A |
| 6" × 6" | 1.1983 | 3.2 mm | 3.2 mm | 3.2 mm | 3.6 mm | N/A | N/A |
| 6" × 8" | 1.6030 | 3.4 mm | 3.6 mm | 3.3 mm | 4.0 mm | 3.9 mm | 3.9 mm |

The foregoing description is illustrative of particular embodiments of the invention, but is not meant to be a limitation upon the practice thereof. The following claims, including all equivalents thereof, are intended to define the scope of the invention.

The invention claimed is:

1. A fabric formed from a plurality of fibers, each of said plurality of fibers comprising;
    a thermoplastic polymer having a cross-section and a length, the cross-section being between 0.1 and 400 microns; and
    a particulate comprising a plurality of spherical particles, and a plurality of flattened and misshaped particles formed from spherical particles, said particulate distributed in said thermoplastic polymer where said particulate is stainless steel making the fiber detectable by X-ray detection or magnetic detection, the particulate having a shortest linear dimension, as measured from among three orthogonal Cartesian coordinates axes X-Y-Z that is less than or equal to one half an average dimension along the three orthogonal Cartesian coordinate axes X-Y-Z of the cross-section wherein said particulate is present from 2 to 12 total weight percent of the total weight of the fiber.

2. A fabric formed from a plurality of fibers, each of said plurality of fibers comprising;
    a thermoplastic polymer having a cross-section and a length, the cross-section being between 0.1 and 400 microns; and
    a particulate comprising a plurality of spherical particles, and a plurality of flattened and misshaped particles formed from spherical particles, said particulate distributed in said thermoplastic polymer, said particulate making the fiber detectable by X-ray detection or magnetic detection, the particulate having a shortest linear dimension, as measured from among three orthogonal Cartesian coordinates axes X-Y-Z that is less than or equal to one half of an average dimension along the three orthogonal Cartesian coordinate axes X-Y-Z of the cross-section wherein said particulate is present from 2 to 12 total weight percent of the total weight of the fiber; and
    wherein said particulate is one of iron, bronze, brass, barium salts, cobalt, titanium, tin, copper, tungsten, platinum, silver, bismuth, zinc, lead, molybdenum, neodymium, samarium, alloys of any of the aforementioned metals, oxides of any of the aforementioned metals, or nitrides of any of the aforementioned metals.

3. The fabric of claim 1, wherein said thermoplastic polymer is one of polypropylene, polyethylene, polybutene, polyisobutylene, a polyamide, a polyacrylate, a polystyrene, a polyurethane, an acetal resins, a polyethylene vinyl alcohol; a polyester, a polyphenylene sulfide, a thermoplastic elastomer, a polyacrylonitrile; a cellulose, a polyaramid, or a block copolymer containing at least one of the aforementioned polymers.

4. The fabric of claim 1 wherein said thermoplastic polymer is a single composition with the cross section that is one of circular, multi-lobal or polygonal.

5. The fabric of claim 1 further comprising a sheath surrounding said thermoplastic polymer.

6. A fabric formed from a plurality of fibers, each of said plurality of fibers comprising;
    a thermoplastic polymer having a cross-section and a length, the cross-section being between 0.1 and 400 microns;
    a particulate comprising a plurality of spherical particles, and a plurality of flattened and misshaped particles formed from spherical particles, said particulate distributed in said thermoplastic polymer, said particulate making the fiber detectable by X-ray detection or magnetic detection, the particulate having a shortest linear dimension, as measured from among three orthogonal Cartesian coordinates axes X-Y-Z that is less than or equal to one half an average dimension along the three orthogonal Cartesian coordinate axes X-Y-Z of the cross-section;
    wherein said particulate is present from 2 to 12 total weight percent of the total weight of the fiber; and
    wherein said thermoplastic polymer is a melt drawn thermoplastic.

7. The fabric of claim 1 wherein said particulate forms protrusions on said thermoplastic polymer.

8. A process of detecting a fabric article comprising:
    forming a fiber comprising a polymer having a cross-section and a length; and a particulate including a plurality of spherical particles and a plurality of flattened and misshaped particles formed from spherical particles, said particulate distributed in said polymer to form protrusions, where said particulate is stainless steel making the fiber detectable by balanced coil metal detection wherein said particulate is present from 2 to 12 total weight percent of the total weight of the fiber;
    forming a fabric from said fiber;
    manufacturing the fabric article from said fabric;
    passing the fabric article through a metal detector; and
    collecting a signal from said metal detector indicative of the presence of the fabric article.

9. The process of detecting the fabric article of claim 8 wherein the fabric article is a hair net, wipe, shoe cover, coverall suit, apron, beard cover, mop head, or filter.

10. The process of detecting the fabric article of claim 8 wherein the fabric article is non-woven.

11. The fabric of claim 2, wherein said thermoplastic polymer is one of polypropylene, polyethylene, polybutene, polyisobutylene, a polyamide, a polyacrylate, a polystyrene, a polyurethane, an acetal resins, a polyethylene vinyl alcohol; a polyester, a polyphenylene sulfide, a thermoplastic elastomers, a polyacrylonitrile; a cellulose, a polyaramid, or a block copolymer containing at least one of the aforementioned polymers.

12. The fabric of claim 2 wherein said thermoplastic polymer is a single composition with the cross section that is one of circular, multi-lobal or polygonal.

13. The fabric of claim 2 further comprising a sheath surrounding said thermoplastic polymer.

14. The fabric of claim 6 wherein said particulate is stainless steel.

15. The fabric of claim 6 wherein said particulate is one of iron, bronze, brass, steel, barium salts, cobalt, titanium, tin, copper, tungsten, platinum, silver, bismuth, zinc, lead, molybdenum, neodymium, samarium, alloys of any of the aforementioned metals, oxides of any of the aforementioned metals, or nitrides of any of the aforementioned metals.

16. The fabric of claim 6, wherein said thermoplastic polymer is one of polypropylene, polyethylene, polybutene, polyisobutylene, a polyamide, a polyacrylate, a polystyrene, a polyurethane, an acetal resins, a polyethylene vinyl alcohol; a polyester, a polyphenylene sulfide, a thermoplastic elastomers, a polyacrylonitrile; a cellulose, a polyaramid, or a block copolymer containing at least one of the aforementioned polymers.

17. The fabric of claim 6 wherein said thermoplastic polymer is a single composition with the cross section that is one of circular, multi-lobal or polygonal.

18. The fabric of claim 6 further comprising a sheath surrounding said thermoplastic polymer.

\* \* \* \* \*